Oct. 25, 1955     A. SOMERVILLE     2,721,478
MASS REACTION FLOW METER
Filed March 26, 1953
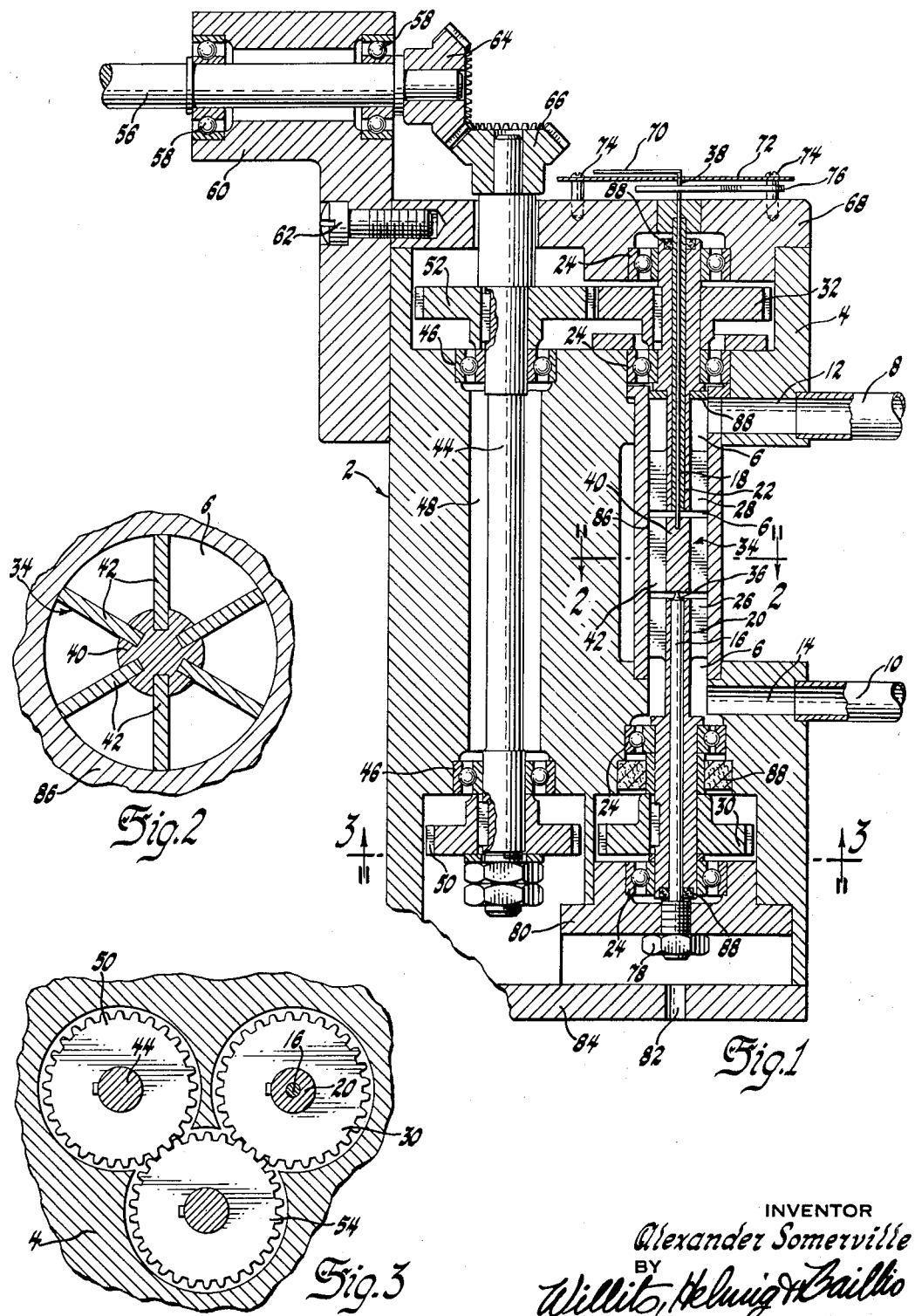
INVENTOR
Alexander Somerville
BY
Willits, Helmig & Baillio
ATTORNEYS United States Patent Office 2,721,478
Patented Oct. 25, 1955

2,721,478
MASS REACTION FLOW METER

Alexander Somerville, Birmingham, Mich., assignor to General Motors Corporation, Detroit, Mich., a corporation of Delaware Application March 26, 1953, Serial No. 344,855

14 Claims. (Cl. 73—194)

The invention relates to a device for measuring the rate of flow of a fluid and particularly to a device for measuring the instantaneous fluid flow rate in terms of the mass or weight of fluid flowing per unit of time.

It is frequently desirable to be able to measure the rate of flow of a fluid in terms of its mass or weight as for example in industrial chemistry where two or more substances are required to be combined in a certain molecular ratio. Since the number of molecules of a substance is proportional to the weight of the substance such a combination is more readily obtained where the weight or mass flow of the substances being combined is known.

Conventional fluid flow measurement requires the use of a weighing tank, displacement tank, restrictive orifice or other means all of which are unsatisfactory in that they fail to give instantaneous flow, are applicable only to non-volatile fluids, or require computation of changeable fluid characteristics such as temperature, pressure, density, etc.

It is now proposed to provide a means of measuring the weight or mass flow of a fluid directly and without interrupting the fluid flow, which means are independent of the characteristics of the fluid, quantity of fluid, or frictional losses of flow responsive elements. It is further proposed to provide a device embodying these factors which is compact in arrangement, readily assembled and disassembled, and is inexpensive to manufacture.

In the drawing:

Figure 1 is a cross-sectional view of the proposed flow meter adapted to be connected to a fluid flow stream and a driving source.

Figure 2 is a fragmentary view of the proposed device showing a cross-sectional view of the reactor member of the device as taken in the plane of line 2—2 of Figure 1 viewed in the direction of the arrows thereon.

Figure 3 is a fragmentary cross-sectional view of the proposed device showing driving means employed to actuate one of the rotating elements therein and is taken in the plane of line 3—3 on Figure 1 as viewed in the direction of the arrows.

The proposed fluid flow meter 2 comprises a casing or housing 4 having a fluid flow passage 6 formed therein and adapted to have a fluid flow therethrough by means of conduits 8 and 10 secured in openings 12 and 14 formed through the housing and in communication with the fluid flow passage.

Shafts 16 and 18 are mounted within the housing adjacent the ends of the fluid flow passage 6 and are centrally disposed within each end of the fluid flow passage in axial alignment and spaced relation with respect to each other. Sleeve members 20 and 22 are journaled about the shafts 16 and 18 respectively and are rotatably mounted within the housing by means of bearings 24. Impeller members 26 and 28 are formed near the ends of the sleeve members within the fluid flow passage and are adapted to be driven by gear members 30 and 32 secured near the other ends of the sleeve members. A reactor member 34 is centrally disposed within the fluid flow passage and between the impeller members 26 and 28 by means of a jewelled bearing 36 formed on the shaft 16, projected into one end of the fluid flow passage, and a rotatable rod 38 journaled within the shaft 18, of tubular construction, extended into the other end of the flow passage.

The impeller members 26 and 28 and the reactor member 34 are basically similar in construction in that each comprises a central portion or hub 40 of similar cross-sectional area and each has a plurality of circumferentially spaced blades 42 radially extended to the wall of the fluid flow passage. The blades extend radially from and parallel with the axis of the fluid flow passage and act essentially as paddle wheels when the members are rotated.

The impeller members 26 and 28 are adapted to be rotated transversely with respect to the flow of fluid through the fluid flow passage, at the same speed and in opposite directions. A drive shaft 44 is journaled within bearings 46 mounted in a passage 48 formed through the housing and has gear members 50 and 52 secured thereto in mating relation with respect to the gear members 30 and 32 of the sleeve members. The one drive shaft gear 52 directly engages the one sleeve member gear 32 driving the impeller 28 in one direction and the other drive shaft gear 50 engages an intermediate gear 54, mounted within the housing and meshing with the other sleeve member gear 30, to drive the other impeller 26 in the opposite direction. The drive shaft may be driven in any suitable manner but in this instance is driven by a driving shaft 56 mounted in bearings 58 provided within a support member 60 secured to the housing by bolts 62 and through mating bevel gears 64 and 66 secured to the respective shafts.

As the fluid flows through the fluid flow passage 6 and the impeller members 26 and 28 are driven in opposite directions at the same speed, the upstream impeller transfers energy to the fluid which is evidenced as a torque applied to the reactor member proportional to the fluid density per unit of time multiplied by the square of the angular velocity of the impeller. Since the velocity of rotation of the impellers is constant, the torque exerted on the reactor member is proportional to the mass of fluid flowing per unit of time. Rotation of the downstream impeller in a direction opposite to that of the upstream impeller provides compensation for torque due to fluid viscosity or turbulence and assures the resultant torque applied to the reactor member of being a true measure of the mass fluid flow so long as the reactor member 6 is spaced equidistant between the impeller members 26 and 28. The inclusion of the oppositely rotating impeller members 26 and 28 also permits use of this device for fluid flowing in either direction through the passage 6.

The rotation of the reactor member may be caused to indicate the mass flow of the fluid by any suitable manner but in the present instance the rotatable rod 38 secured to the reactor member extends through the tubular shaft 18 and the housing plate member 68 closing one end of the housing and has a pointer 70 attached thereto positioned over an indexed dial or plate 72 secured to the housing plate member by bolts 74. The rod is resiliently biased against rotation by coiled hair spring means 76 secured in the conventional manner to the shaft and one of the bolts 74 secured to the housing.

In order to insure the proper positioning of the reactor member 34 within the fluid flow passage 6 the shaft 16 is adapted to be secured to a set screw or similar device 78 threaded within a flange member 80 secured within the housing and adjacent one end of the fluid flow passage. The shaft 16 is axially movable within the fluid flow passage by adjustment of the set screw through an opening 82 provided in the plate member 84 closing the other end of the housing. The fluid flow passage in the present em
86 adapted
and allowi
visual acce
flow passa;

Sealing
flow passa;
fluid flow
bearing m
pendent u
their effect

When fl
and the in
in opposite
member 3
fluid flow
pointed 7(
the reacto
through tl
the rotata
rections a
both direc

I claim:
1. A flu
passage fc
fluid there
in spaced
axial ther
said passa;
bers, mea
in one dir
in the oth
fluid flowi
to said r
member
rotation t
passage.

2. A fl
passage f
through,
fluid flow
a reactor
tween an
actor me
substanti
fluid flov
impeller
impeller
for agita
means co
ing said
the react
measure 3. A f
passage
through,
end of s
said pass
of radial
passage t
means fc
one dire
in the otl
fluid flov
to said
member
said reac
said pass 4. A
housing
direction
mounted
tion to
impeller
impeller rod in said passage and disposed coaxially with and between said impeller members, said reactor member and said impeller members comprising a plurality of blades extending radially and parallel with respect to the axis of said passage, means for rotating said impellers transversely with respect to said flow of fluid in said passage and in opposite directions and at the same speed for agitating said fluid, and means connected to said rod of said reactor member resiliently biasing said reactor member against rotation and indicating the reactionary rotation thereof as a measure of the mass flow of said fluid through said passage.

9. A device for measuring the mass flow of a fluid comprising a housing having a passage for the flow of a fluid in one direction therethrough, axially aligned shafts mounted in said housing and extending within each end of said passage, a rotatable sleeve member mounted about and coaxial with each of said shafts, an impeller member secured to each of said sleeve members in said passage, the one of said impeller members being in spaced relation to the other of said impeller members, one of said shafts comprising a tubular shaft having a rotatable shaft extending through said tubular shaft, a reactor member secured to said rotatable shaft in said passage and between said impeller members, said reactor member and said impeller members each being axially aligned with respect to one another and said passage and each comprising a plurality of blades extending radially and parallel with respect to the flow of said fluid in said passage, means for rotating said impeller members transversely with respect to the flow of fluid in said passage and in opposite directions and at the same speeds, and means connected to said rotatable shaft resiliently biasing said reactor member against rotation and indicating the rotation of said reactor member in terms of the mass flow of said fluid in said passage.

10. A fluid flow meter comprising a fluid flow conduit having axially aligned impeller members rotatably mounted within said conduit and coaxially disposed with respect thereto, a reactor member rotatably mounted within said conduit between and coaxial with said impeller members, means for rotating said impeller members in opposite directions at the same rotational velocities for agitating the fluid flowing through said conduit and over said reactor member, and means connected to said reactor member resiliently biasing said reactor member against rotation and indicating the reactionary rotation thereof from such agitation and fluid flow as a measure of fluid flow through said conduit.

11. A fluid flow meter comprising a fluid flow conduit having impeller members rotatably mounted therein and axially aligned with respect to each other and coaxial with said conduit, said impeller members including a plurality of radially extending blades disposed substantially parallel to the axis of said conduit, a reactor member rotatably mounted within said conduit between and coaxial with said impeller members, means for rotating said impeller members in opposite directions at the same rotational velocities for agitating the fluid flowing through said conduit, and means connected to said reactor member resiliently biasing said reactor member against rotation and indicating the reactionary rotation thereof as a measure of fluid flow through said conduit.

12. A fluid flow meter comprising a conduit having a fluid flow passage formed therethrough, axially aligned impeller members rotatably mounted within said passage and coaxially disposed with respect to the axis of said passage, a reactor member rotatably mounted within said conduit between and coaxial with said impeller members, said reactor member including a plurality of radially extending blades disposed substantially parallel to the axis of said passage, means for rotating said impeller members in opposite directions at the same rotational velocities for agitating the fluid flowing through said passage, and means connected to said reactor member resiliently biasing said reactor member against rotation and indicating the reactionary rotation thereof from such agitation and fluid flow as a measure of fluid flow through said conduit.

13. A fluid flow meter comprising a conduit having a fluid flow passage formed therethrough, axially aligned impeller members rotatably mounted within each end of said passage and coaxially disposed with respect to the axis of said passage, a reactor member rotatably mounted within said passage between and coaxial with said impeller members, said impeller and reactor members each including a plurality of radially extending blades disposed substantially parallel to the axis of said passage, means for rotating said impeller members in opposite directions at the same rotational velocities for agitating the fluid flowing through said passage, and means connected to said reactor member resiliently biasing said reactor member against rotation and indicating the reactionary rotation thereof as a measure of fluid flow through said conduit.

14. A fluid flow meter comprising a fluid flow conduit, axially aligned impeller members rotatably mounted within said conduit and coaxially disposed with respect to the axis of said conduit, said impeller members including a plurality of radially extending blades, said blades of each impeller member being similarly disposed with respect to the axis of said passage, a reactor member rotatably mounted within said conduit between and coaxial with said impeller members, means for rotating said impeller members in opposite directions at the same rotational velocities for agitating the fluid flowing through said conduit, and means connected to said reactor member resiliently biasing said reactor member against rotation and indicating the reactionary rotation thereof as a measure of fluid flow through said conduit.

References Cited in the file of this patent

UNITED STATES PATENTS 2,602,330   Kollsman _____ July 8, 1952